(No Model.)
A. J. & J. H. MARSHALL.
GRAIN THRASHER AND SEPARATOR.
No. 302,010. Patented July 15, 1884.
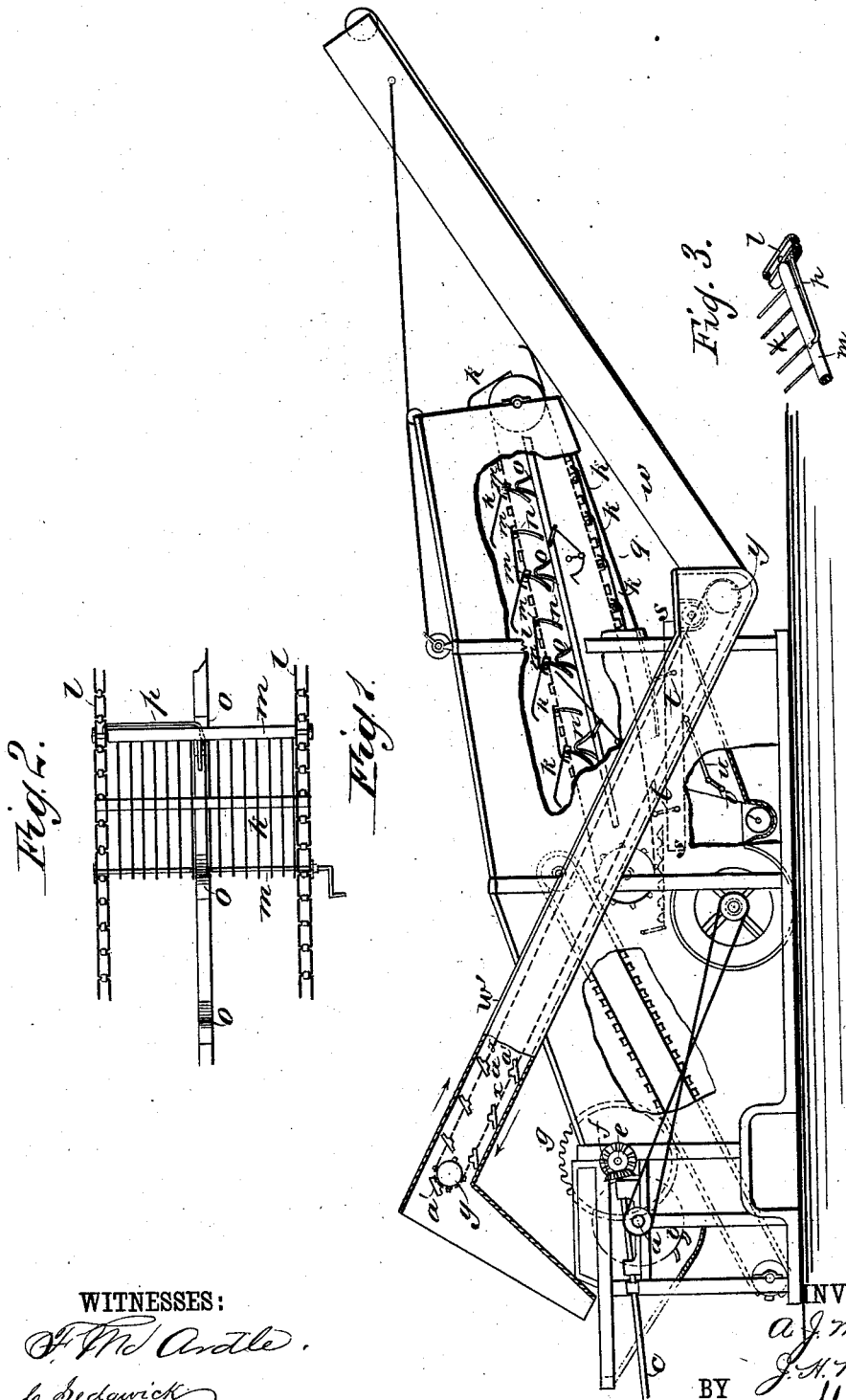
WITNESSES:
INVENTOR:
BY
ATTORNEYS.

UNITED STATES PATENT OFFICE.

ALBERT J. MARSHALL AND JOSIAH H. MARSHALL, OF EVANSVILLE, WIS.

GRAIN THRASHER AND SEPARATOR.

SPECIFICATION forming part of Letters Patent No. 302,010, dated July 15, 1884.

Application filed February 18, 1884. (No model.)

*To all whom it may concern:*

Be it known that we, ALBERT J. MARSHALL and JOSIAH H. MARSHALL, both of Evansville, in the county of Rock and State of Wisconsin, have invented a new and Improved Grain Thrasher and Separator, of which the following is a full, clear, and exact description.

Our invention relates to improvements in grain thrashers and separators; and it consists in the peculiar construction and arrangement of parts, as hereinafter fully described, and pointed out in the claims.

Reference is to be had to the accompanying drawings, forming part of this specification, in which the same letters of reference indicate the same or corresponding parts in all the figures.

Figure 1 is a side elevation of a thrashing and separating machine, with some parts in section, and being constructed with our improvements. Fig. 2 is a detail of the straw-separator in plan view. Fig. 3 is a detail perspective view of the same.

Referring to the drawings, *b* is the thrashing-cylinder; *a*, its shaft; *c*, the motor-shaft; *e*, a counter-shaft geared with the motor-shaft by bevel-wheels *f*, and *g* a gear-wheel on the opposite end of the counter-shaft *e*, which gear-wheel meshes with a pinion on the cylinder-shaft for driving the same. The remainder of the machine is to be driven from a pulley mounted on the counter-shaft outside of the gear-wheel *g*. The sieve-shaker *s* is suspended by short side links, *t*, and is connected by a rod, *u*, to the crank *v*.

*w* is the chute of the straw-stacker, and *w'* is the elevator for returning the unthrashed heads from the bottom of the said stacker-chute to the thrashing-cylinder. The elevator consists of a single chain, *x*, having blocks *a'*, and passes around chain-wheels *y*.

The rising and falling agitating-fingers *k* employed on the endless straw carrier and separator *l*, and the pivoted bars *m*, on which they are mounted, are so arranged that the fingers of one bar *m* will reach beyond the next bar *m* having fingers, and overlap said fingers to prevent the straw from falling down and being clogged in the carrier between the fingers of the different bars, which is a difficulty in separators having fingers falling short of each other. Another difficulty with such fingers is that while they are thrust up quickly by the contact of the arms *n* with the studs *o* they do not fall quickly enough to keep ahead of the straw and prevent it from working under the ends of the fingers and clogging the separator. To avoid this we provide said fingers with springs to thrust them down in advance of the straw, and in this case we have arranged a torsion or other spring, *p*, with each finger-bar *m*, connecting one end with said bar at the middle or other point and the other end with one of the chains of the carrier *l*. These springs hold the fingers close against the cross-bars of the carrier, so that the bars are enabled to run against the surface of the chute *q* in their return course, and thus save the expense and space required for a special carrier to discharge the grain off from said chute into the sieve-shaker *s*.

Having thus described our invention, what we claim as new, and desire to secure by Letters Patent, is—

1. In a straw carrier and separator, the combination of the carrier-belts *l*, rocking bars *m*, beater-fingers *k*, arms *n*, studs *o*, and springs for accelerating the closing action of the fingers, substantially as described.

2. The combination of the endless carrier-belts *l*, beater-fingers *k*, springs for accelerating the closing action of the fingers, and also for holding said fingers closed on the returning side of carrier, and the chute *q*, for delivering the grain to the shaker *s*, substantially as described.

ALBERT J. MARSHALL.
JOSIAH H. MARSHALL.

Witnesses:
DAVID L. MILLS,
WILLIAM F. WILLIAMS.